Dec. 1, 1925.

M. P. CLOUGH ET AL 1,564,123

AUTOMOBILE SIGNAL

Filed Jan. 21, 1922

WITNESSES
W. L. Jones
A. L. Kitchin

INVENTORS
M. P. Clough
N. H. Noyes
BY
ATTORNEYS

Dec. 1, 1925. 1,564,123
M. P. CLOUGH ET AL
AUTOMOBILE SIGNAL
Filed Jan. 21, 1922 2 Sheets-Sheet 2
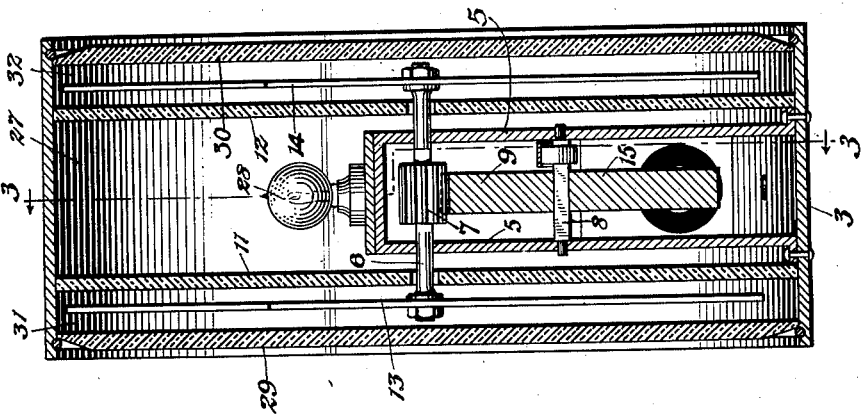
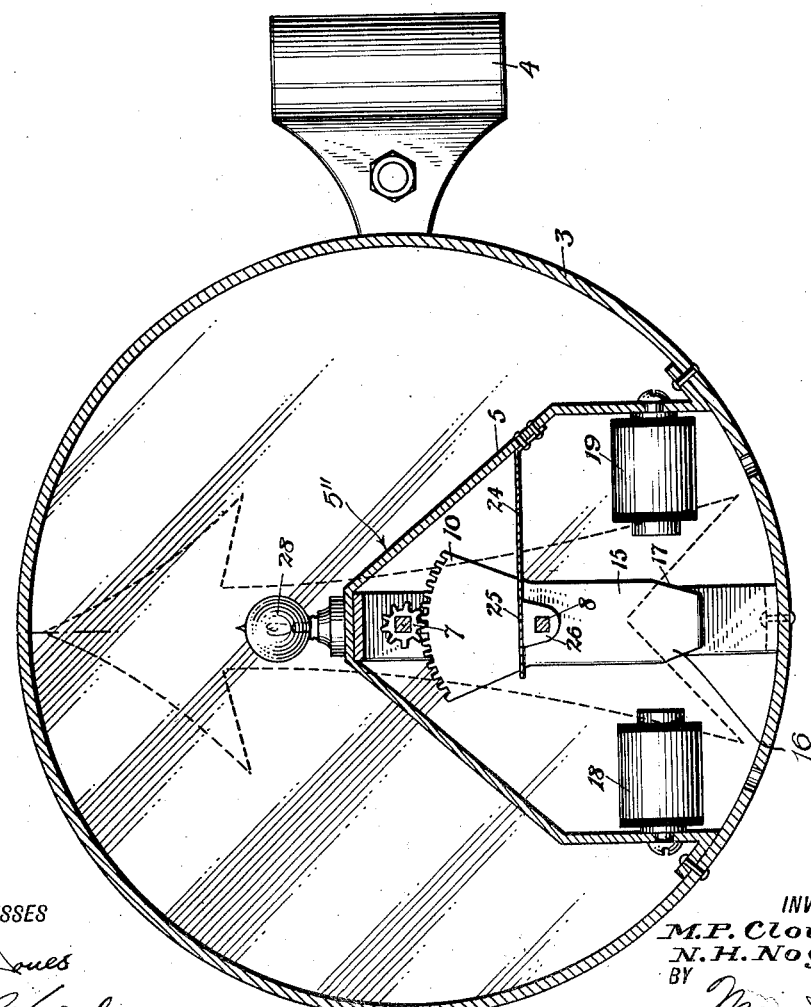
WITNESSES
INVENTORS
M.P. Clough
N.H. Noyes
BY
ATTORNEYS Patented Dec. 1, 1925.

1,564,123

UNITED STATES PATENT OFFICE.

MOOERS P. CLOUGH AND NED H. NOYES, OF NORTH HAVERHILL, NEW HAMPSHIRE.

AUTOMOBILE SIGNAL.

Application filed January 21, 1922. Serial No. 530,891.

*To all whom it may concern:*

Be it known that we, MOOERS P. CLOUGH and NED H. NOYES, both citizens of the United States, and residents of North Haverhill, in the county of Grafton and State of New Hampshire, have invented a new and Improved Automobile Signal, of which the following is a full, clear, and exact description.

This invention relates to signal devices for automobiles and has for an object to provide an improved construction which may be applied to any desired part of the automobile for signaling both toward the front and toward the rear.

Another object of the invention is to provide a signal device for automobiles which may be connected to the windshield of the automobile and which may be seen by the driver, those in front of the automobile and also those at the rear of the automobile.

A further object of the invention is to provide a signal device for automobiles which may be seen day and night and which may be operated by the driver at any time to give a right or left turning signal.

In the accompanying drawings—

Figure 2 is a vertical sectional view through Figure 1 approximately on line 2—2.

Figure 3 is a sectional view through Figure 2 on line 3—3.

Figure 1:
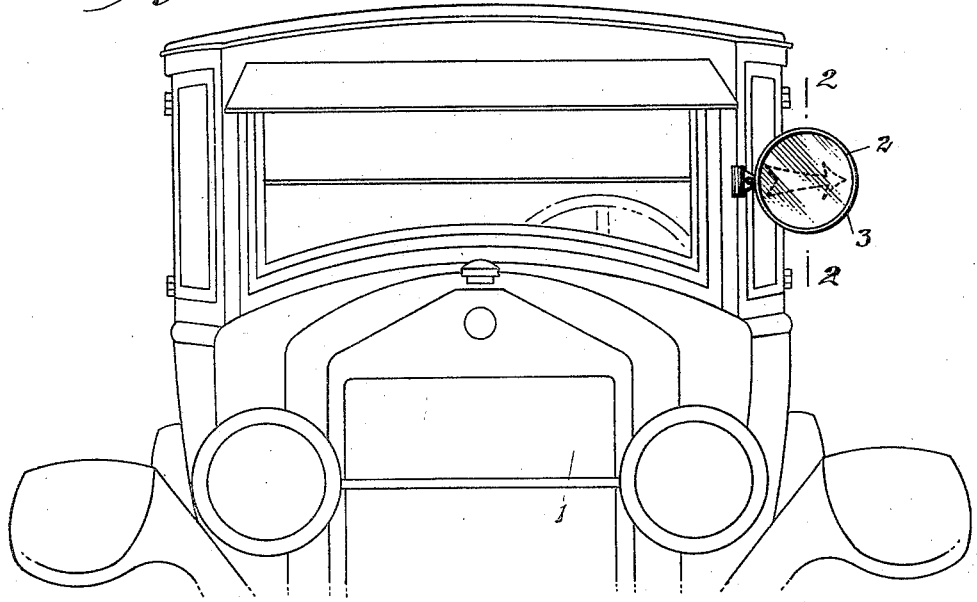
Figure 1 is a front view of part of an automobile with an embodiment of the invention applied thereto.
Figure 4:
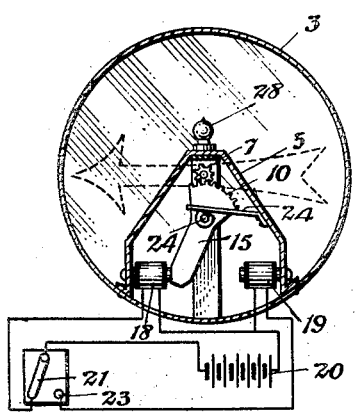
Figure 4 is a view similar to Figure 3 except that the same is on a reduced scale and the parts shown as operated for moving the pointer in one direction.
Figure 5:
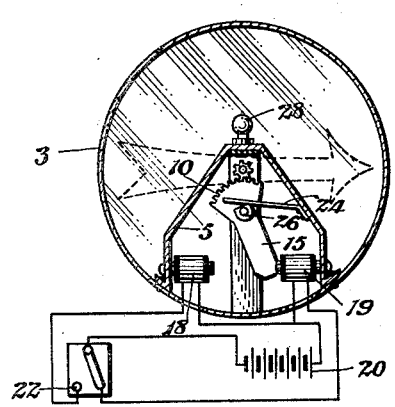
Figure 5 is a view similar to Figure 4 but showing the parts operated for moving the pointer in the opposite direction.

Referring to the accompanying drawings by numeral, 1 indicates an automobile of any desired kind and 2 indicates a signal attachment as a whole. This attachment is provided with a casing 3 of any suitable structure to which a clamp 4 is secured, said clamp being designed to be clamped on to the windshield of the automobile 1 or some other part of the machine. The casing 3 is shown as an annular member but may be formed of other shapes without departing from the spirit of the invention, said casing having secured thereto a frame generally indicated by the reference character 5 which comprises an inverted U-shaped member 5' having its ends secured to the bottom of the casing 3, and a second frame member 5'' crossing the bridge portion of the U-shaped member 5' and having extremities extending outwardly and downwardly with the ends thereof secured to the bottom of the casing. The leg portions of the U-shaped member 5' rotatably supports shafts 6 and 8. Shaft 6 carries a pinion 7 which is in mesh with gear segment 9 carried by shaft 8. The end portions of shaft 6 extend through openings in the glass plates 11 and 12. Pointers 13 and 14 are secured to the ends of shaft 6. The segment 9 is provided with an extension 15 preferably formed of flattened portions 16 and 17, said extension being of magnetic material, as for instance, steel or soft iron whereby the extension will act as an armature for the electro-magnets 18 and 19, which magnets are rigidly secured to the extremities of frame member 5. The magnets 18 and 19 are connected to a suitable source of current 20 as shown in Figures 4 and 5 and to a switch 21, which when positioned as shown in Figure 4 will close the circuit of magnet 18 whereby the pointers 13 and 14 are turned in opposite directions for indicating a turning of the automobile in one direction. By bringing the switch to the position shown in Figure 5 the magnet 19 will be energized and the pointers brought to points in the opposite direction. The switch 21 is arranged on or near the steering wheel so that the one driving the car may readily cause an actuation of the pointers 13 and 14. When it is desired to bring the pointer back to normal, namely, to a vertical position, the switch 21 is moved out of engagement with the respective contacts 22 and 23 and the weight of the parts will cause the pointer to assume the vertical position as shown in dotted lines in Figure 3. In order to assist this movement and also to hold the pointer in this position, a flat spring 24 is rigidly secured to the frame member 5 and rests against the flat portion 25 of the member 26 rigidly secured to the shaft 8.

As shown in Figure 2, the glass plates 11 and 12 form an inner chamber 27 in which the frame 5 and associated parts are arranged including a lamp 28. Spaced from the glass plates 11 and 12 are glass plates 29 and 30 whereby outer chambers 31 and 32 are formed, said outer chambers accommodating the pointers 13 and 14. The glass plates 29 and 30 are clear while the glass plates 11 and 12 are frosted whereby the pointers may be readily seen in the day-time but the frame 5 and associated parts cannot be seen. At night the lamp 28 is lighted, said lamp being preferably in the circuit with the headlights so that whenever the headlights are lighted this lamp will also be lighted. This arrangement permits the pointers to be seen either day or night by anyone in the rear or anyone in the front as well as by the driver.

What we claim is:—

1. In a signal device of the character described, a casing, a supporting frame within the casing comprising an inverted U-shaped member having its ends secured to the bottom of the casing, a second frame member crossing the bridge portion of said U-shaped member and having extremities extending outward and then downward and the ends thereof secured to the bottom of the casing, a shaft journaled between the leg portions of said U-shaped member, a pinion fixed upon the shaft, an electro-magnet carried by each extremity of the second frame member, an armature supported for free swinging movement between the leg portions of the U-shaped member, said armature having its one end disposed between the electro-magnets and its other end formed with gear teeth and said teeth being in mesh with the pinion, and signal elements carried by said shaft.

2. In a signal device of the character described, a casing, a supporting frame within the casing comprising an inverted, U-shaped member having its ends secured to the bottom of the casing, a second member engaging upon the bridge portion of the U-shaped member and having extremities extending outwardly and then downwardly and the ends of said extremities secured to the bottom of casing, a signal shaft journaled between the legs of the U-shaped member, a pinion fixed upon the shaft, an electro-magnet carried by each extremity of the second member, a second shaft journaled between the leg portions of the U-shaped member, an elongated armature fixed upon the second shaft, said armature having one end disposed between the electro-magnets and its other end formed with gear teeth and said gear teeth in mesh with the pinion upon the signal shaft, a block fixed upon the second named shaft, said block having a flat face, and a leaf spring secured at its one end to an extremity of the second-named frame member and its other end engaging upon the flat face of the block whereby the armature is normally held in its non-operative position with relation to said signal shaft.

MOOERS P. CLOUGH.
NED H. NOYES.